(12) United States Patent
Klais et al.

(10) Patent No.: US 7,077,234 B2
(45) Date of Patent: Jul. 18, 2006

(54) RACK AND PINION STEERING ASSEMBLY

(75) Inventors: Matthew E Klais, Waterford, MI (US); Nicholas Rosenthal, West Bloomfield, MI (US); William J Thomas, West Bloomfield, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 215 days.

(21) Appl. No.: 10/739,618

(22) Filed: Dec. 18, 2003

(65) Prior Publication Data

US 2005/0072258 A1  Apr. 7, 2005

Related U.S. Application Data

(60) Provisional application No. 60/508,581, filed on Oct. 3, 2003.

(51) Int. Cl.
*B62D 5/06* (2006.01)

(52) U.S. Cl. ............... 180/428; 436/148; 280/93.515; 280/93.514

(58) Field of Classification Search ............... 180/436, 180/428, 148; 280/93.515, 93.514
See application file for complete search history.

(56) References Cited

U.S. PATENT DOCUMENTS

| | | | | |
|---|---|---|---|---|
| 2,898,737 A | * | 8/1959 | Rockwell | .............. 60/430 |
| 3,426,863 A | * | 2/1969 | Hanson | .............. 180/437 |
| 3,869,139 A | * | 3/1975 | Gage | .............. 280/93.515 |
| 3,958,462 A | * | 5/1976 | Matschinsky et al. | .............. 74/498 |
| 4,488,615 A | | 12/1984 | Millard | |
| 5,531,287 A | * | 7/1996 | Sherman | .............. 180/417 |
| 5,921,343 A | * | 7/1999 | Yamakaji | .............. 180/436 |
| 5,934,404 A | * | 8/1999 | DeLellis et al. | .............. 180/436 |
| 6,176,343 B1 | * | 1/2001 | Vincent et al. | .............. 180/428 |
| 6,189,902 B1 | * | 2/2001 | Lenzen et al. | .............. 280/93.515 |
| 6,510,917 B1 | * | 1/2003 | Cole | .............. 180/437 |

* cited by examiner

*Primary Examiner*—Lesley D. Morris
*Assistant Examiner*—Marlon Arce-Diaz
(74) *Attorney, Agent, or Firm*—Ralph E. Smith

(57) ABSTRACT

A rack-and-pinion assembly comprises a housing, a rotatable pinion gear including a plurality of teeth, and at least one moveable mount for providing a moveable attachment of the housing to the vehicle. A rack is slidably positioned within the housing and includes a plurality of teeth corresponding to the pinion teeth. A tie rod is operably attached to one of two ends of the rack, and may also be attached to a first wheel. A cross car link is operably attached to the first wheel and a second wheel. Rotation of the pinion gear causes translational movement of the rack and tie rod relative to the housing, which may thereby turn the first wheel. The first front wheel cooperates with the cross car link to simultaneously turn the second wheel, and the housing moves with respect to the vehicle as the first and second wheels turn.

18 Claims, 7 Drawing Sheets

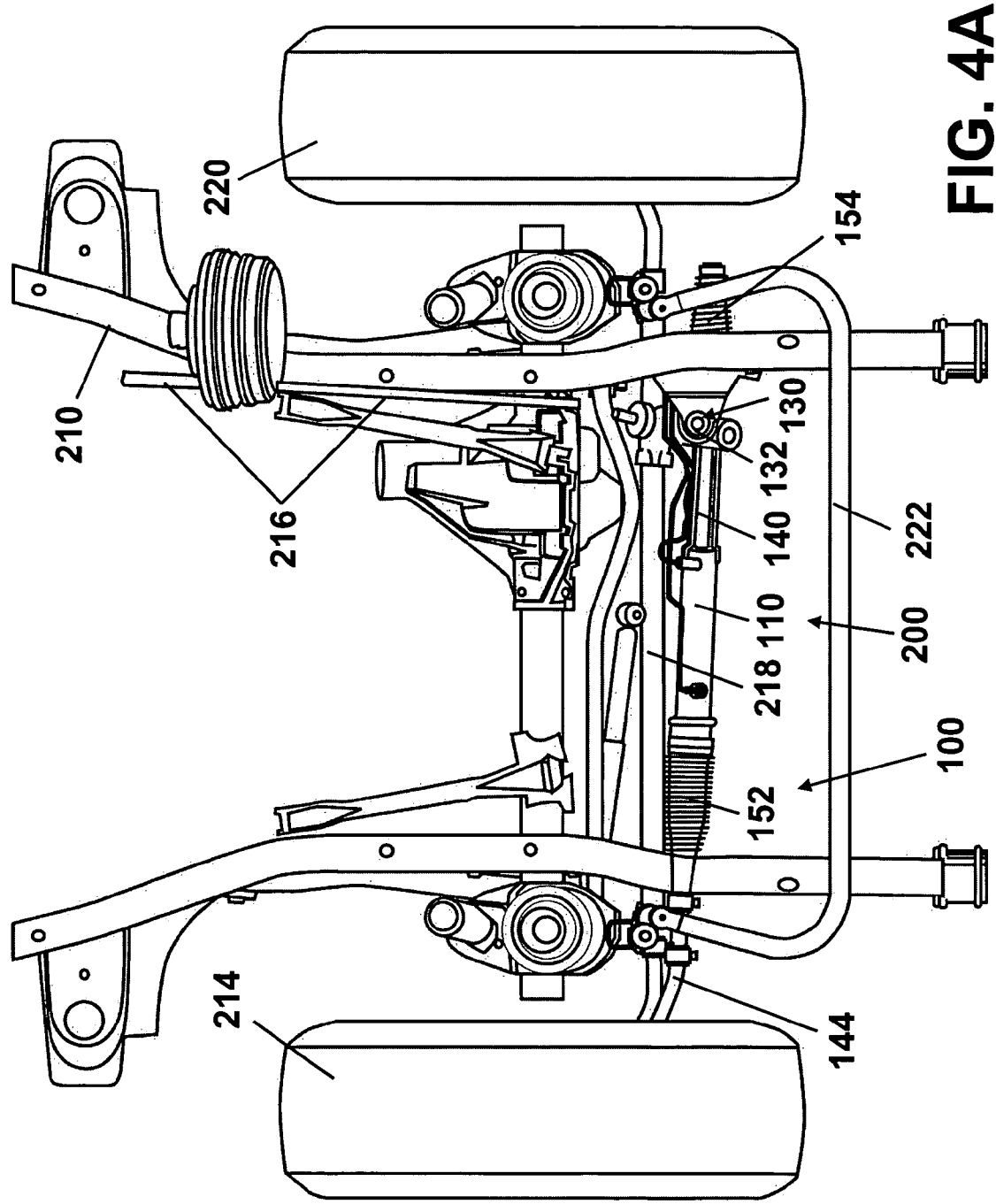

RACK AND PINION STEERING ASSEMBLY

CROSS-REFERENCE TO RELATED APPLICATIONS

This application claims the benefit of U.S. Provisional Patent Application Ser. No. 60/508,581, filed Oct. 3, 2003.

STATEMENT REGARDING FEDERALLY SPONSORED RESEARCH

Not applicable.

BACKGROUND OF THE INVENTION

1. Field of the Invention

The present invention relates generally to vehicular steering systems. More particularly, the invention relates to a rack-and-pinion actuated drag link steering assembly and system.

2. Description of Related Art

Numerous strategies have been developed to actuate steering in motor vehicles. Some steering systems include a pair of steering knuckles supported on a chassis for vertical suspension purposes and for movement of wheels about a pair of axes. The wheels are rotatably mounted to the steering knuckles are free to pivot thereby allowing the vehicle to turn. A rack-and-pinion steering system typically includes a rack and pinion steering assembly fixably mounted to the chassis, and a pair of tie rods attaching the steering gear to the steering knuckles. An integral gear steering system may include a steering gear operably attached to the chassis and a drag link positioned between the steering gear and the tie rods. Both the rack-and-pinion and integral gear steering systems are usually fixably mounted to the chassis wherein no motion is provided at the fixed mount during steering maneuvers.

The integral gear steering system usually has greater mass than the rack-and-pinion steering system but relatively greater compliance due to dimensional clearances in the pivotal connections between the additional structural elements. The integral gear steering system may be more suitable for motor "heavy-use" vehicles subject to a wide range of loads (e.g., vans, trucks, sport utility vehicles, etc.) than the rack-and-pinion steering system unless complex and expensive structure is provided to account for the reduced compliance of the rack-and-pinion steering system relative to the integral gear steering system. The rack-and-pinion type steering system, however, may be advantageous to other types of steering arrangements (including integral gear steer systems) in that it is relatively lightweight, has a comparatively simple arrangement, provides superior steering performance, and requires a small mounting space.

FIG. 1 is a perspective view of a prior art rack-and-pinion assembly, shown generally by numeral 10. Assembly 10 comprises a cylindrical housing 20 including a slidable rack 22 partially enclosed therein. Rack 22 includes a plurality of teeth 24 that engage complementary teeth 26 on a pinion gear 28. Tie rods 30, 32 are positioned at opposing ends of the rack 22 for attachment to steering knuckles (not shown). A plurality of chassis mounts 34, 36 provide fixable attachment means to a vehicle chassis. Pinion gear 28 may be coupled to a steering wheel (not shown) and a shaft 38 so that when a vehicle operator turns the steering wheel, pinion gear teeth 26 rotatably mesh with corresponding rack teeth 24. The rotational movement of the steering wheel is converted into a linear motion on the rack 22 thereby providing the motion to turn the vehicle wheels. Typically, a gear reduction between the pinion gear 28 and rack 22 is provided to make it easier for the vehicle operator to steer.

Many rack-and-pinion type steering designs include means for hydraulically assisting the motion of the rack-and-pinion and, thus, the steering wheel. In this case, a piston 40 is slidably positioned within a fluid chamber 42 of the housing 20 whereby hydraulic fluid 44 pressure may build-up on either side of the piston 40 during steering maneuvers. The pressure difference forces the piston 40 to translate in a direction according to the rotation of a steering wheel thereby providing an assisting force to a vehicle operator. Hydraulic ports 46, 48 allow differential fluid flow on either side of the piston 40. To control the hydraulic fluid 44 pressures, a rotary valve 50 may be provided to sense force applied to the steering wheel. The rotary valve 50 controls a hydraulic pump (not shown), which can generate the differential fluid pressure on the piston 40 through a hydraulic circuit 52, which includes the hydraulic ports 46, 48.

The integral gear steer system may include a recirculating ball steering gear and linkage. The gear may contain a worm gear including a threaded shaft positioned within a correspondingly threaded block. The block is fixed to the shaft (and the steering wheel), so the steering wheel, shaft, and block may turn in unison. The worm gear may include a plurality of ball bearings positioned within threads of the shaft and block to reduce friction, wear, and steering tolerance or so-called "slop". The block may include additional teeth that engage a sector gear or like member attached to a cross link steering system.

FIG. 2A is an elevated perspective view of a prior art integral gear steering system 70 operably attached to first and second vehicle wheels 80, 82 wherein the steering system 70 is shown in a "straight" configuration. Steering system 70 includes a swinging pitman arm 72 that pivots with respect to a vehicle chassis 84 at a pivoting link 74. Pitman arm 72 is connected to a recirculating ball steering gear, which is connected to an intermediate shaft and a steering column (note: gear, shaft, and column are not shown). A drag link bar 76 is operably attached to the pitman arm 72 and the first vehicle wheel 82 through a steering knuckle (not visible). Drag link bar 76 typically incorporates an adjustment sleeve for steering wheel centering. A cross car link bar 78 is operably attached to both wheels 80, 82 and an anti-sway bar 86 is operably attached adjacent to the cross car link bar 78 ends.

FIG. 2B is an elevated perspective view of the integral gear steering system 70 wherein the steering system 70 is shown in a "right turn" configuration. During operation of the steering system 70, rotation (i.e., in a clockwise direction from the vehicle operator's perspective) of the steering wheel, column, shaft, and gear cause a swinging movement of pitman arm 72. The pitman arm 72 motion biases the drag link bar 76 toward the first vehicle wheel 82 thereby making it pivot to the "right". The first vehicle wheel 82 cooperates with the cross car link bar 78 to simultaneously turn the second wheel 82 to the "right". As with the rack-and-pinion steering assembly, turn assist may be provided by a high-pressure hydraulic system (not shown) wherein fluid pressure provides rotational force to the steering block.

Although the rack-and-pinion and integral gear steering systems may provide adequate steering in many vehicle applications, numerous changes may be implemented to improve these systems. For example, it would be desirable to provide a rack-and-pinion type steering system that is simpler in design and includes less moving parts than an integral gear steer system but may be readily adapted for use in "heavy-use" vehicles.

Therefore, it would be desirable to provide a rack-and-pinion type steering device and assembly that overcomes the aforementioned and other disadvantages.

BRIEF SUMMARY OF THE INVENTION

A first aspect of the present invention provides a rack-and-pinion assembly. The assembly comprises a housing including a hydraulic fluid and a piston slidably positioned therein, a rotatable pinion gear including a plurality of teeth, and at least one moveable mount for providing a moveable attachment to the housing. A rack is slidably positioned within the housing and includes a plurality of teeth corresponding to the pinion teeth. A tie rod is operably attached to one of two ends of the rack. Rotation of the pinion gear causes translational movement of the rack and tie rod relative to the housing. The translational movement of the rack and tie rod are assisted by pressure differences of the hydraulic fluid biasing the piston.

A second aspect of the invention provides a rack-and-pinion steering system for a vehicle. The system comprises a housing movably attached to the vehicle with at least one moveable mount, a rotatable pinion gear including a plurality of teeth, and a rack slidably positioned within the housing and including a plurality of teeth corresponding to the pinion teeth. A tie rod is operably attached to one of two ends of the rack, and to a first wheel. A cross car link is operably attached to the first wheel and a second wheel. Rotation of the pinion gear causes translational movement of the rack and tie rod relative to the housing thereby turning the first wheel. The first front wheel cooperates with the cross car link to simultaneously turn the second wheel. The housing moves with respect to the vehicle as the first and second wheels turn.

A third aspect of the invention provides a vehicle comprising a chassis, a housing including a hydraulic fluid and a piston slidably positioned therein, and a rotatable pinion gear including a plurality of teeth. At least one moveable mount provides a moveable attachment of the housing to the chassis. A rack is slidably positioned within the housing and includes a plurality of teeth corresponding to the pinion teeth. A tie rod is operably attached to one of two ends of the rack, and to a first wheel. A cross car link is operably attached to the first wheel and a second wheel. Rotation of the pinion gear causes translational movement of the rack and tie rod relative to the housing thereby turning the first wheel. The first front wheel cooperates with the cross car link to simultaneously turn the second wheel. The housing moves with respect to the vehicle as the first and second wheels turn. The translational movement of the rack and tie rod are assisted by pressure differences of the hydraulic fluid biasing the piston.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

BRIEF DESCRIPTION OF THE SEVERAL VIEWS OF THE DRAWINGS

The present invention will become more fully understood from the detailed description and the accompanying drawings, wherein:

FIG. 4A is an elevated perspective view of the assembly of FIG. 3 as part of a vehicle steering system in accordance with the present invention, wherein the steering system is shown in a "straight" configuration;

DETAILED DESCRIPTION OF THE INVENTION

Figure 1:
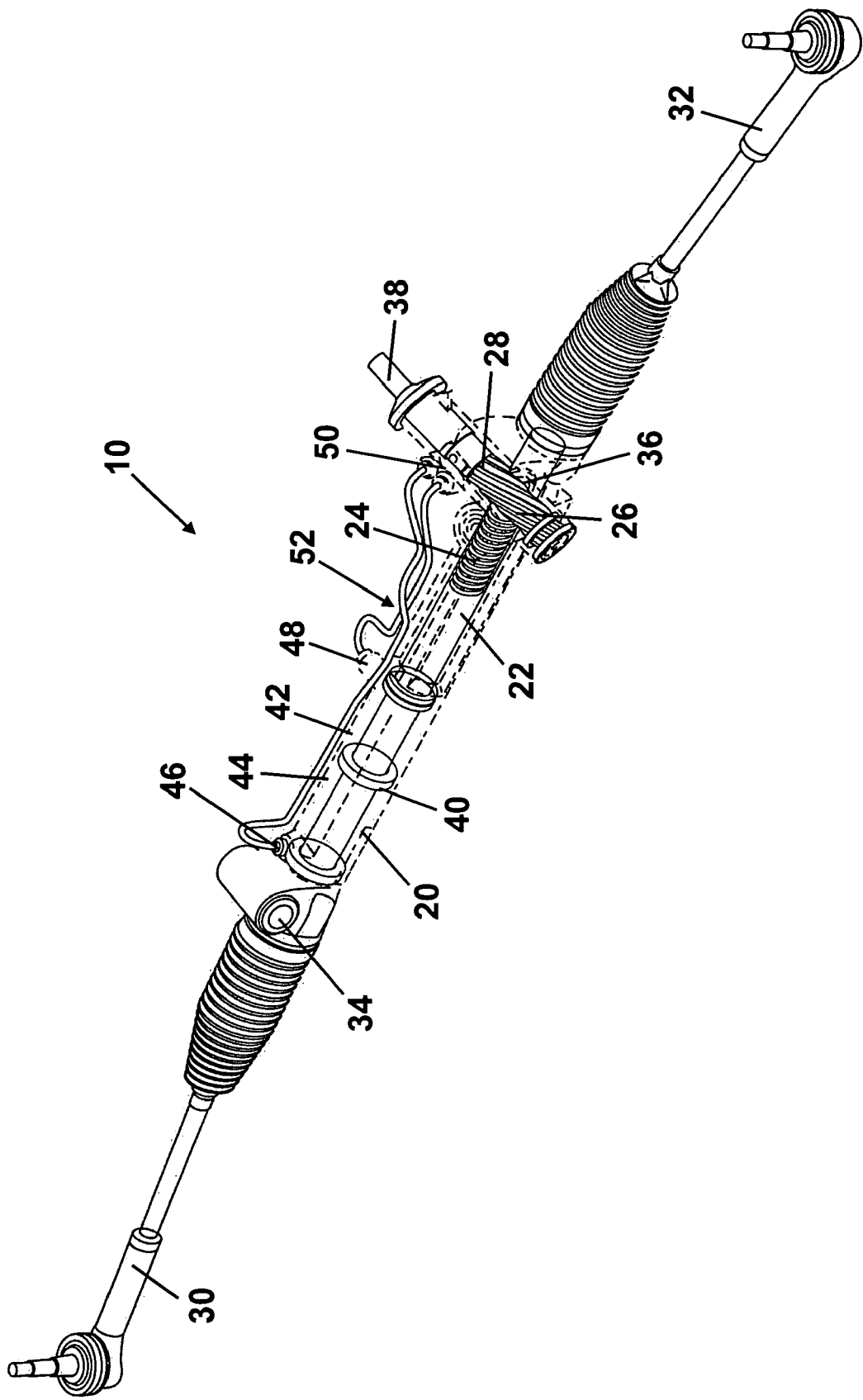
FIG. 1 is a partial cut-away perspective view of a prior art rack-and-pinion assembly.
Figure 2A:
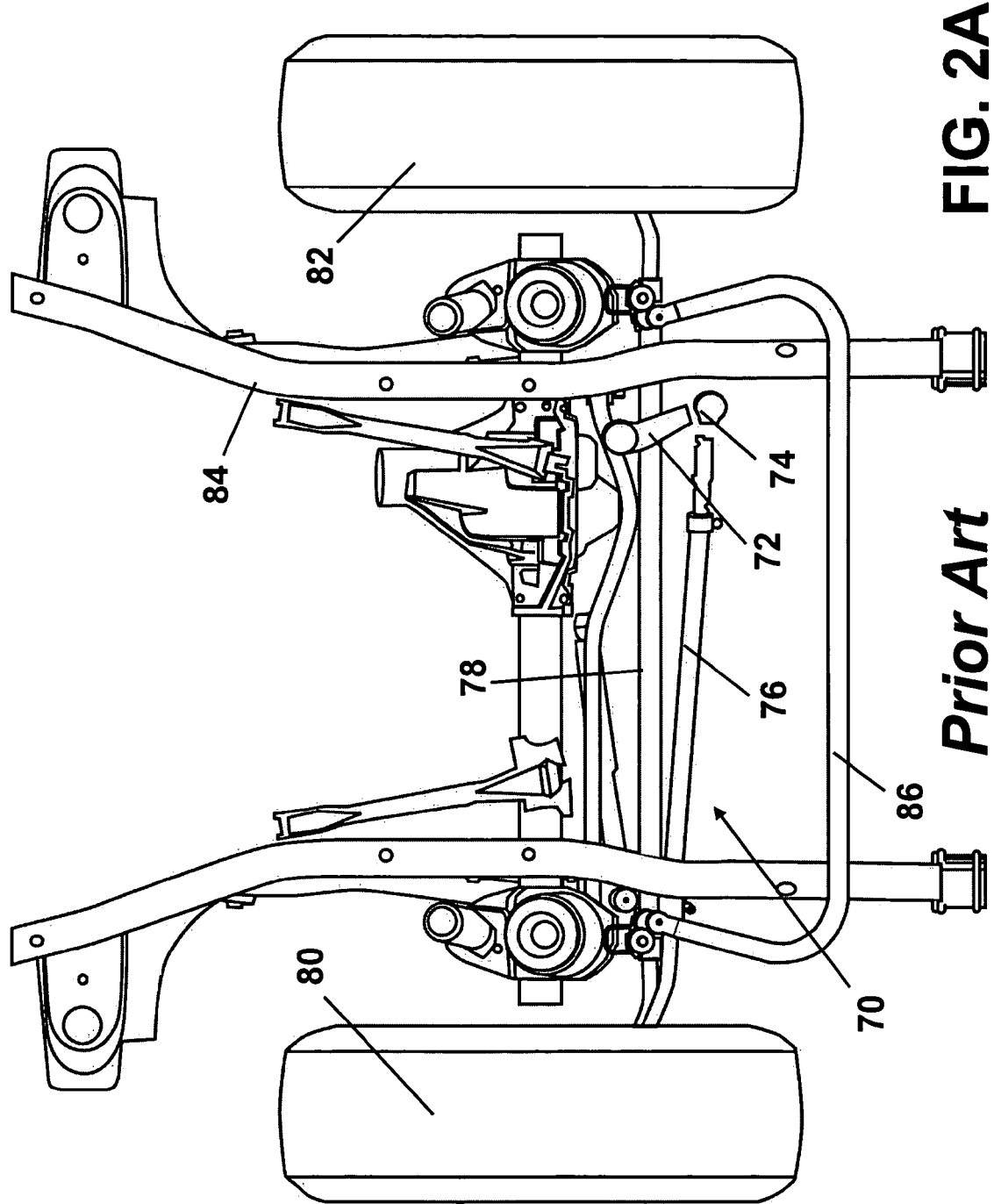
FIG. 2A is an elevated perspective view of a prior art integral gear steering system operably attached to vehicle wheels wherein the steering system is shown in a "straight" configuration.
Figure 2B:
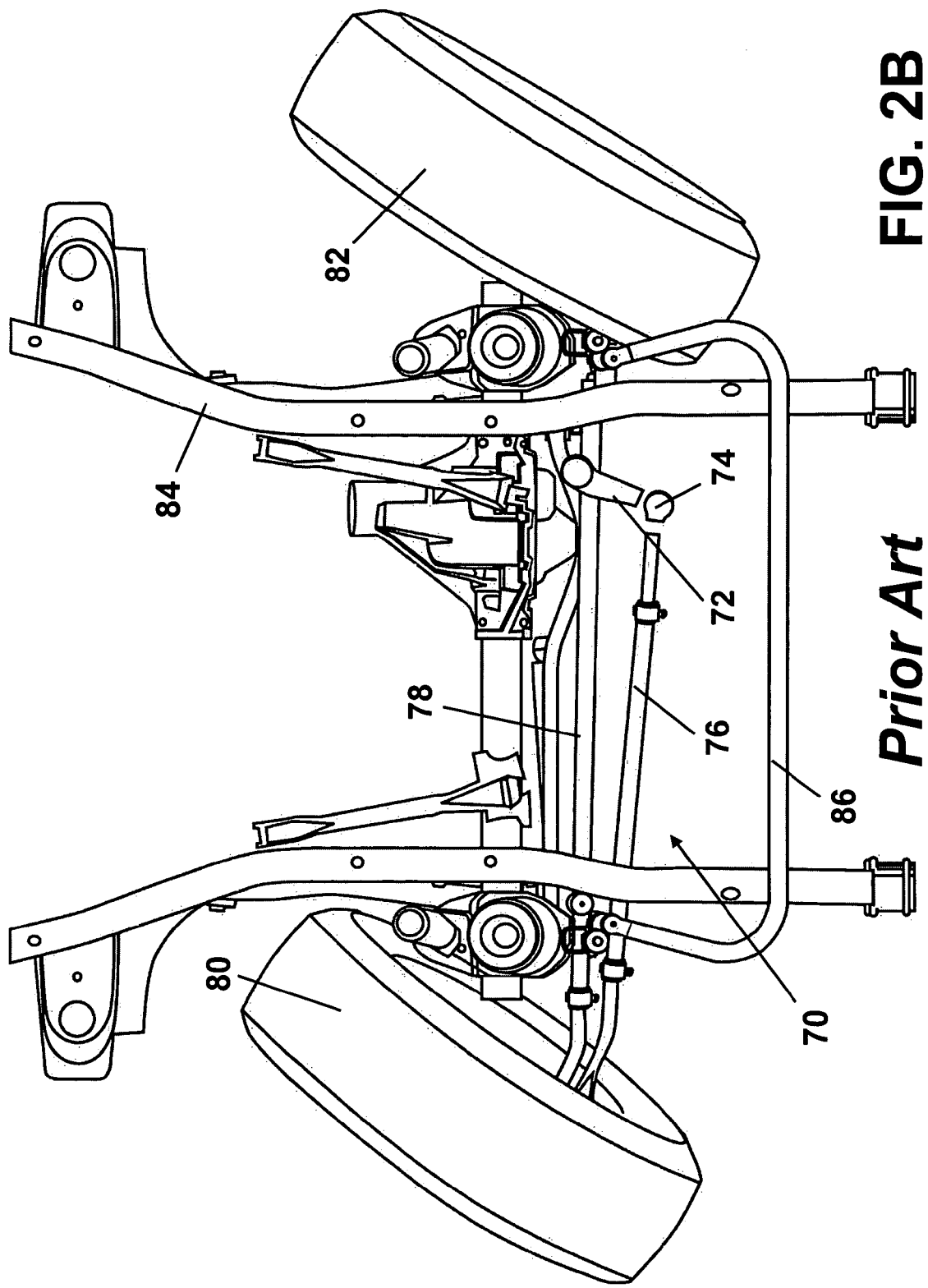
FIG. 2B is an elevated perspective view of a prior art integral gear steering system of FIG. 2A wherein the steering system is shown in a "right turn" configuration.
Figure 3:
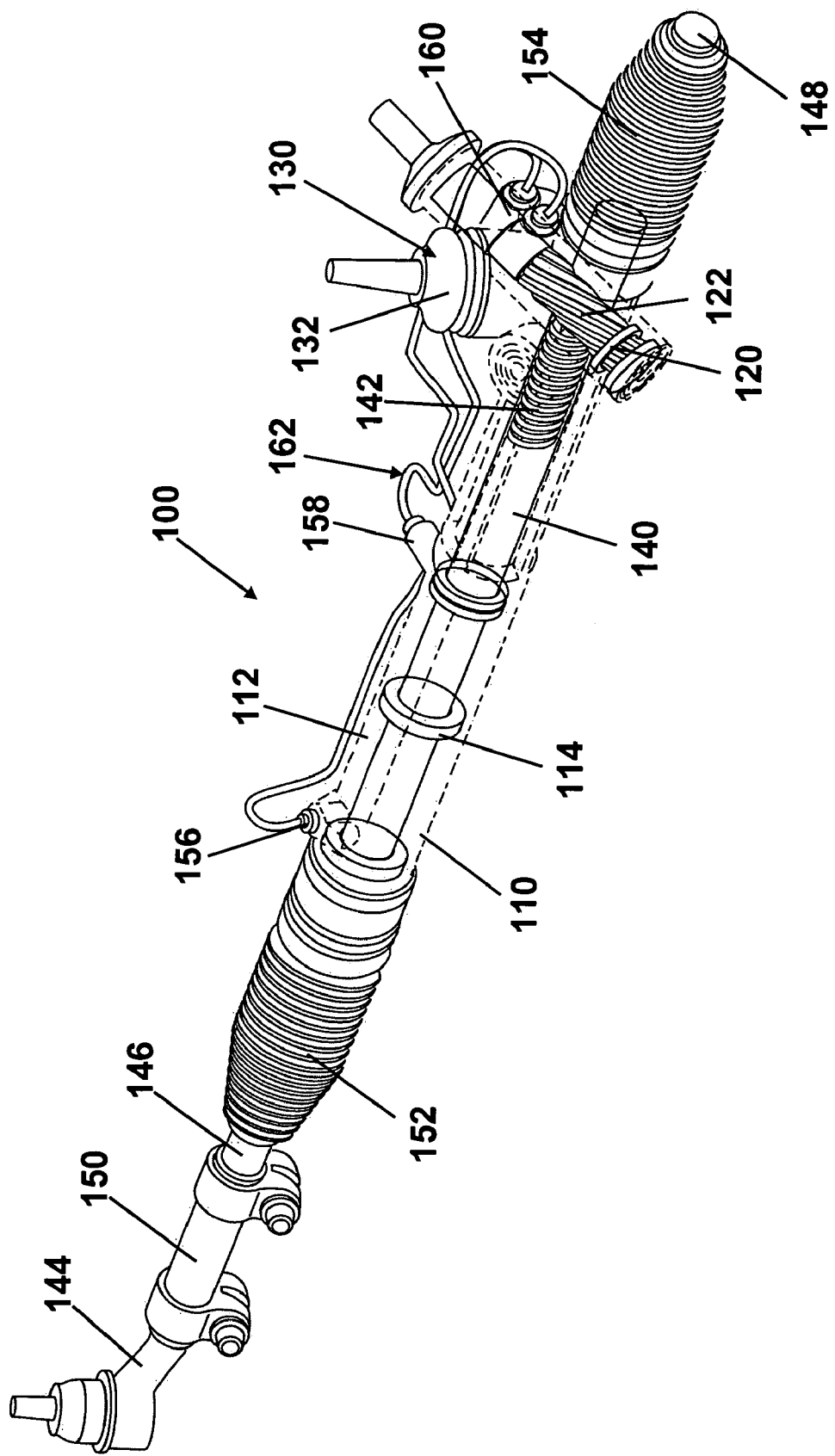
FIG. 3 is a partial cut-away perspective view of an actuated drag link rack-and-pinion assembly in accordance with the present invention.

Referring to the drawings, wherein like reference numerals refer to like elements, FIG. 3 is a perspective view of an actuated drag link rack-and-pinion assembly in accordance with the present invention, the assembly shown generally by numeral 100. A single assembly 100 may be used to replace numerous parts used in prior art steering systems, such as the drag link, pitman arm, and recirculating ball steering gear. This simplified design may reduce cost, number of moving parts, space requirements, and steering tolerance or so-called "slop". Further, the assembly 100 may be adapted for use with both light (e.g., cars) and heavy use vehicle. For example, the assembly 100 may be used to control front steering of a motorized four-wheeled van, truck, automobile, and sport utility vehicle. Alternatively, the assembly 100 may control steering of numerous other motorized and non-motorized vehicles including two or more wheels.

Assembly 100 comprises a housing 110 including a hydraulic fluid 112 and a piston 114 slidably positioned therein, a rotatable pinion gear 120 including a plurality of teeth 122, and at least one moveable mount 130 for providing a moveable attachment to the housing 110. A rack 140 is slidably positioned within the housing 110. Rack 140 includes a plurality of teeth 142 corresponding to the pinion teeth 122. A tie rod 144 is operably attached to one 146 of two ends 146, 148 of the rack 140. Rotation of the pinion gear 120 causes translational movement of the rack 140 and tie rod 144 relative to the housing 110. The translational movement of the rack 140 and tie rod 144 are assisted by pressure differences of the hydraulic fluid 112 biasing the piston 114.

In one embodiment of the present invention, the housing 110 may comprise a cylinder, and the rack 140 may comprise a relatively rigid unitary member. The housing 110, rack 140, and other components of the assembly 100 may be manufactured from a material(s) such as steel, aluminum, metal, metal alloy, composite, polymer, and the like commonly used in the art for vehicle steering components. A variable length adjustment member 150 may be positioned between the rack 140 and tie rod 144 allowing wheel angle tuning.

In one embodiment a pair of boots 152, 154 may flank the housing 110 at either side. Boots 152, 154 typically allow the rack 140 to slide into and out of the housing 110 therethrough while providing a seal from the elements (e.g., water, dirt, dust, etc.). Boots 152, 154 may include a corrugated surface thereby permitting their expansion and contraction during the translational movement of the rack 140. Boots 152, 154 are preferably manufactured from a resilient material such a rubber, polymer, and the like. Moveable mount 130 may comprise a ball joint 132 and a bracket that provides a range of motion of the housing 110 relative to a vehicle chassis during steering maneuvers. In another embodiment, the moveable mount 130 may comprise a bushing or other member(s) adapted for allowing motion (e.g., rotation) between the housing 110 and chassis. Those skilled in the art will recognize that the assembly 100 may be adapted for use in numerous vehicles with various changes to suit a particular application. For example, the type and position of the moveable mount 130 may be varied while still providing the advantages of the present invention.

During steering maneuvers, hydraulic fluid 112 pressure may build-up on either side of the piston 114. The pressure difference forces the piston 114 to translate in a direction according to the rotation of a steering wheel thereby providing an assisting force to a vehicle operator. Hydraulic ports 156, 158 may be provided to allow differential fluid flow on either side of the piston 114. To control the hydraulic fluid 112 pressures, a rotary valve 160 may be provided to sense force applied to the steering wheel. The rotary valve 160 may control a hydraulic pump (not shown) as understood in the art. The hydraulic pump may generate the differential fluid pressure on the piston 114 through a hydraulic circuit 162 in accordance with the direction of the steering wheel rotation.

Figure 4B:
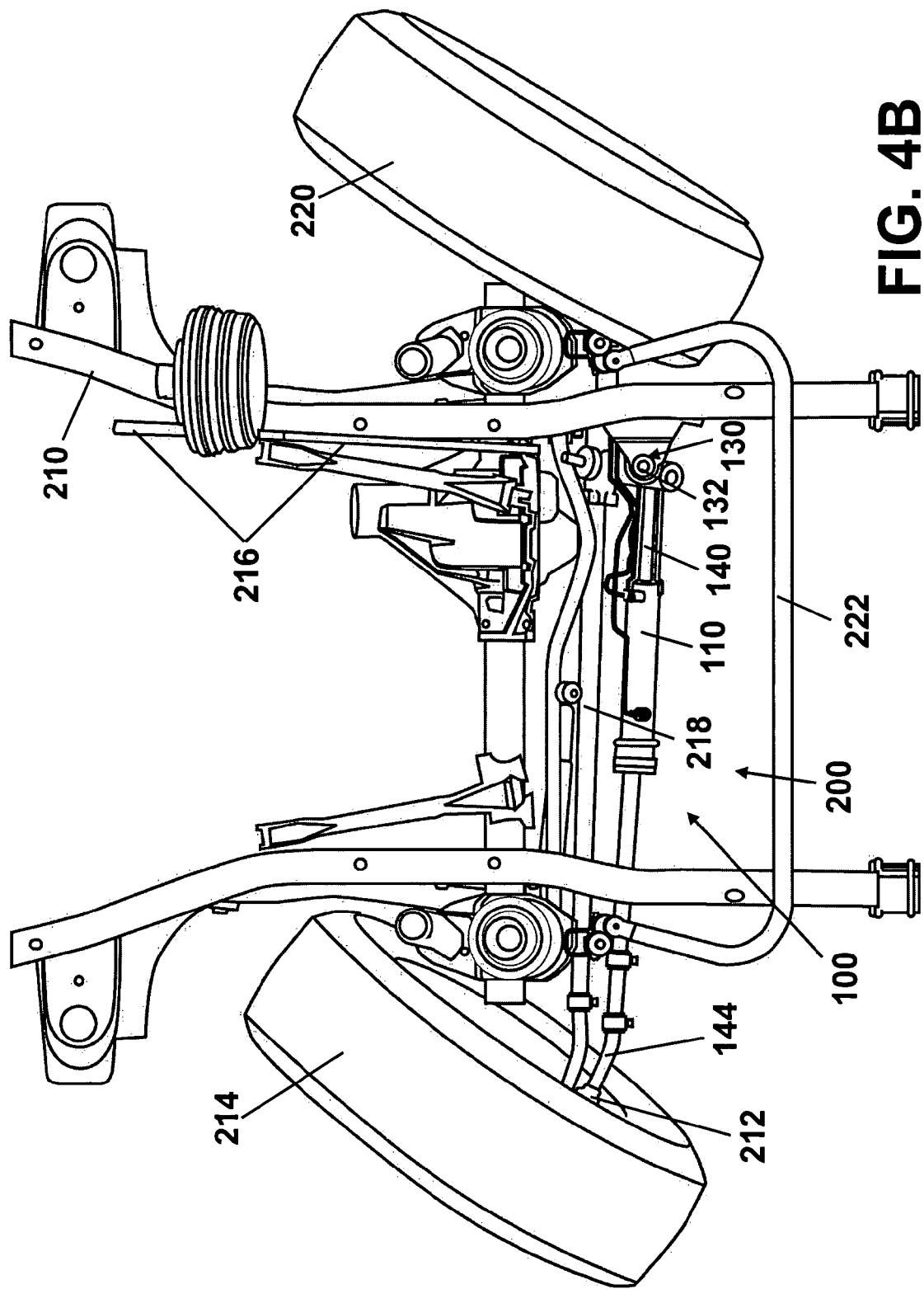
FIG. 4B is an elevated perspective view of the assembly of FIG. 4A wherein the steering system is shown in a "right turn" configuration.

FIG. 4A is an elevated perspective view of the assembly 100 as part of a vehicle steering system 200 in accordance with the present invention. Steering system 200 is shown in a "straight" configuration and operably attached to a vehicle chassis 210. Assembly 100 may be mounted at one end (e.g., the "left" side) with the ball-joint 132 to the chassis 210, and at another end (e.g., the "right" side) with the tie rod 144 to a steering knuckle 212 (see FIG. 4B) and a first wheel 214. An intermediate shaft 216 may be operably connected to a steering column (not shown) and the pinion gear (not visible) for providing rotation input during steering maneuvers. A cross car link 218 may be operably attached to the first wheel 214 and a second wheel 220 and an anti-sway bar 222 may be operably attached adjacent to the cross car link bar 218 ends.

FIG. 4B is an elevated perspective view of the assembly 100 wherein the steering system 200 is shown in a "right turn" configuration. During operation of the steering system 200, rotation (i.e., in a clockwise direction from the vehicle operator's perspective) of the steering wheel, intermediate shaft 216, and pinion gear results in translational movement of the rack 140 and tie rod 144 relative to the housing 110. The rack 140 and tie rod 144 may push against the steering knuckle 212 thereby turning the first wheel 214. The first wheel 214 may cooperate with the cross car link 218 to simultaneously turn the second wheel 220. As the wheels 214, 220 turn, the moveable mount 130 and, specifically, the ball joint 132 may allow the housing 100 to move with respect to the chassis 210 (i.e., in a rotating fashion).

Figure 4C:
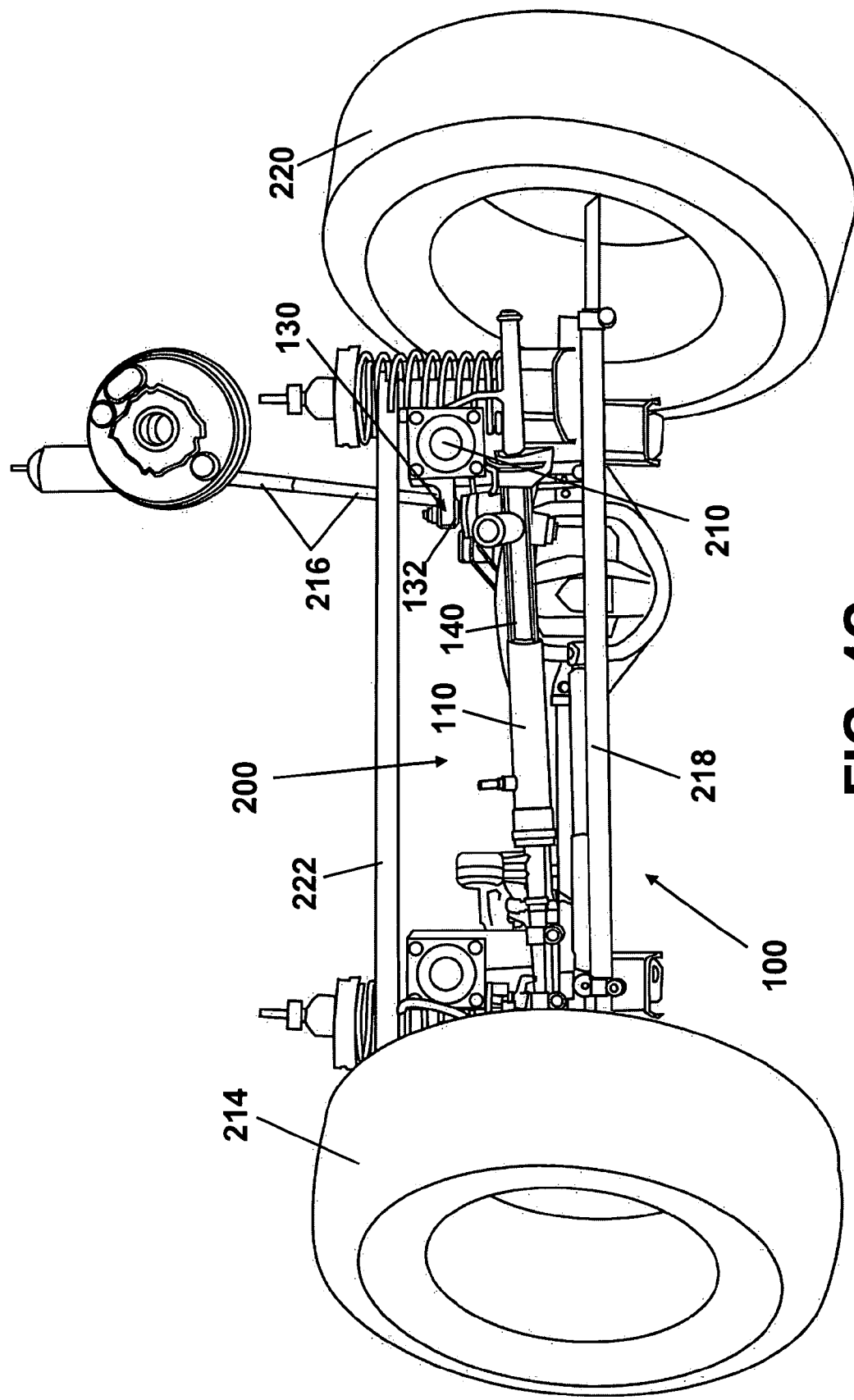
FIG. 4C is an alternative perspective view of the assembly of FIG. 4A wherein the steering system is shown in a "left turn" configuration.

Turning the steering wheel in the opposite direction (i.e., in a counter-clockwise direction from the vehicle operator's perspective) may move the steering system 200 into a "left" turn configuration, shown in FIG. 4C. The rack 140 and tie rod 144 may pull against the steering knuckle 212 thereby turning the first wheel 214 in the opposite direction. First wheel 214 may cooperate with the cross car link 218 to simultaneously turn the second wheel 220. As shown, the rack 140 may slide through the "left" side of the housing 110 (i.e., the boots 152, 154 shown in FIG. 4A have been removed from view in FIGS. 4B and 4C to more clearly illustrate this).

While the embodiments of the invention disclosed herein are presently considered to be preferred, various changes and modifications can be made without departing from the spirit and scope of the invention. The rack-and-pinion assembly, steering system, and vehicle are not limited to any particular design or arrangement. For example, the rack, pinion gear, housing, piston, hydraulic system, moveable mount, cross car link, steering knuckles, chassis, and the materials thereof may vary without limiting the utility of the invention.

Upon reading the specification and reviewing the drawings hereof, it will become immediately obvious to those skilled in the art that myriad other embodiments of the present invention are possible, and that such embodiments are contemplated and fall within the scope of the presently claimed invention. The scope of the invention is indicated in the appended claims, and all changes that come within the meaning and range of equivalents are intended to be embraced therein.

What is claimed is:

1. A rack-and-pinion assembly comprising:
   a housing including a hydraulic fluid and a piston slidably positioned therein;
   a rotatable pinion gear including a plurality of teeth;
   at least one moveable mount for providing a moveable attachment to the housing;
   a rack slidably positioned within the housing and including a plurality of teeth corresponding to the pinion teeth;
   a tie rod operably attached to one of two ends of the rack;
   wherein rotation of the pinion gear causes translational movement of the rack and tie rod relative to the housing; wherein the translational movement of the rack and tie rod are assisted by pressure differences of the hydraulic fluid biasing the piston;
   wherein the moveable mount comprises a ball joint.

2. The assembly of claim 1 wherein the rack comprises a unitary member.

3. The assembly of claim 1 wherein the moveable attachment comprises a swivel attachment.

4. The assembly of claim 1 further comprising an adjustment member positioned between the rack and tie rod, wherein the adjustment member provides a variable length adjustment between the rack and tie rod.

5. A rack-and-pinion steering system for a vehicle, the system comprising:
   a housing movably attached to the vehicle with at least one moveable mount, arranged to allow the housing to move relative to the vehicle;

a rotatable pinion gear including a plurality of teeth;

a rack slidably positioned within the housing and including a plurality of teeth corresponding to the pinion teeth;

a tie rod operably attached to one of two ends of the rack, and to a first wheel; and a cross car link operably attached to the first wheel and a second wheel; wherein rotation of the pinion gear causes translational movement of the rack and tie rod relative to the housing thereby turning the first wheel, the first front wheel cooperating with the cross car link to simultaneously turn the second wheel; wherein the housing moves with respect to the vehicle as the first and second wheels turn.

6. The system of claim 5 wherein the rack comprises a unitary member.

7. The system of claim 5 wherein the moveable attachment comprises a swivel attachment.

8. The system of claim 5 wherein the moveable mount comprises a ball joint.

9. The system of claim 5 wherein the moveable mount comprises a bushing.

10. The system of claim 5 further comprising an adjustment member positioned between the rack and tie rod, wherein the adjustment member provides a variable length adjustment between the rack and tie rod.

11. The system of claim 5 further comprising:

a cylinder including a hydraulic fluid positioned therein; and a piston slidably positioned within the cylinder and operably attached to the rack; wherein the translational movement of the rack and tie rod are assisted by pressure differences of the hydraulic fluid biasing the piston.

12. The system of claim 5 further comprising an intermediate shaft operably attached to a steering column and the pinion gear wherein rotation of the steering column results in rotation of the intermediate shaft and the pinion gear.

13. A vehicle comprising:

a chassis;

a housing including a hydraulic fluid and a piston slidably positioned therein;

a rotatable pinion gear including a plurality of teeth;

at least one moveable mount attaching the housing to the chassis so as to allow the housing to move relative to the chassis;

a rack slidably positioned within the housing and including a plurality of teeth corresponding to the pinion teeth;

a tie rod operably attached to one of two ends of the rack, and to a first wheel; and a cross car link operably attached to the first wheel and a second wheel; wherein rotation of the pinion gear causes translational movement of the rack and tie rod relative to the housing thereby timing the first wheel, the first front wheel cooperating with the cross car link to simultaneously turn the second wheel; wherein the housing moves with respect to the vehicle as the first and second wheels turn; wherein the translational movement of the rack and tie rod are assisted by pressure differences of the hydraulic fluid biasing the piston.

14. The vehicle of claim 13 wherein the rack comprises a unitary member.

15. The vehicle of claim 13 wherein the moveable attachment comprises a swivel attachment.

16. The vehicle of claim 13 wherein the moveable mount comprises a ball joint.

17. The vehicle of claim 13 wherein the moveable mount comprises a bushing.

18. The vehicle of claim 13 further comprising an intermediate shaft operably attached to a steering column and the pinion gear wherein rotation of the steering column results in rotation of the intermediate shaft and the pinion gear.

* * * * *